(12) United States Patent
Kwon et al.

(10) Patent No.: US 8,103,320 B2
(45) Date of Patent: Jan. 24, 2012

(54) PORTABLE TERMINAL FOR PROVIDING VISUAL AND ACOUSTIC CONVENIENCE AND ROTARY TYPE HINGE APPARATUS THEREFOR

(75) Inventors: Hyun-Woo Kwon, Gumi-si (KR); Jae-Wan Park, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 804 days.

(21) Appl. No.: 11/968,317

(22) Filed: Jan. 2, 2008

(65) Prior Publication Data
US 2008/0167086 A1     Jul. 10, 2008

(30) Foreign Application Priority Data
Jan. 5, 2007    (KR) .................. 10-2007-0001370

(51) Int. Cl.
*H04M 1/00* (2006.01)
(52) U.S. Cl. .................. 455/575.3; 455/566; 455/575.1; 455/575.4; 455/575.8
(58) Field of Classification Search .................. 455/566, 455/575.1–575.8
See application file for complete search history.

(56) References Cited

U.S. PATENT DOCUMENTS

| | | | |
|---|---|---|---|
| 7,055,219 B2* | 6/2006 | Shiba | 16/367 |
| 7,522,947 B2* | 4/2009 | Tsuda | 455/575.3 |
| 2006/0116157 A1* | 6/2006 | Takamori et al. | 455/550.1 |
| 2006/0199606 A1* | 9/2006 | Makino | 455/550.1 |
| 2008/0076490 A1* | 3/2008 | Kosugi | 455/575.3 |

FOREIGN PATENT DOCUMENTS
KR    10-2004-0069468 A    8/2004
\* cited by examiner

*Primary Examiner* — Dai A Phuong
(74) *Attorney, Agent, or Firm* — Jefferson IP Law, LLP

(57) ABSTRACT

A rotary-type hinge apparatus for a folder-type portable terminal is provided. For a portable terminal including a main body, a folder, a connection member for coupling the main body with the folder, and a hinge apparatus for rotatably coupling the connection member to the main body, a rotary-type hinge apparatus includes housing means mounted in the connection member, cam means including a center cam unit having at least three cam faces and a pair of side cam units for moving towards or away from the center cam unit according to the rotation of the folder in order to maintain close contact with selected cam faces, and adjusting the rotation angle of the folder by cam movement with the selected cam faces while being accommodated in the housing means, elastic bodies for causing the side cam units to closely contact the selected cam faces while being accommodated in the housing means, and an axis extending in a longitudinal direction of the center cam unit. Thus, the rotary-type hinge apparatus can allow users to conveniently view moving pictures.

13 Claims, 5 Drawing Sheets

_US 8,103,320 B2_

PORTABLE TERMINAL FOR PROVIDING VISUAL AND ACOUSTIC CONVENIENCE AND ROTARY TYPE HINGE APPARATUS THEREFOR

PRIORITY

This application claims the benefit under 35 U.S.C. §119 (a) of a Korean patent application filed in the Korean Intellectual Property Office on Jan. 5, 2007 and assigned Serial No. 2007-1370, the entire disclosure of which is hereby incorporated by reference.

BACKGROUND OF THE INVENTION

1. Field of the Invention

The present invention generally relates to a portable terminal. More particularly, the present invention relates to a rotary-type hinge apparatus for a portable terminal, which provides convenience to a user when watch moving pictures for a long time.

2. Description of the Related Art

Generally, a "portable terminal" is a term that refers to an electronic apparatus which provides mobile communication to users. Recently, portable terminals are not only used as a simple mobile communication apparatus, but are also used as a complex apparatus including a multimedia apparatus for playing a music file and a moving picture file and a banking service apparatus for providing retail payment and mobile banking.

The portable terminals can be classified as bar-type terminals, flip-type terminals, and folder-type terminals according to their appearance. Recently emerging sliding-type terminals, together with the folder-type terminals, are mainstream in the portable terminal market.

The bar-type terminal has a single housing in which data input/output means, a transmitting unit (or mouthpiece), and a receiving unit (or earpiece) are mounted. The bar-type terminal has a simple structure because all the components for a mobile communication function are installed in the single housing. However, the bar-type terminal has a limitation on its miniaturization because a sufficient distance has to be secured between the transmitting unit and the receiving unit.

In the flip-type terminal, a flip cover is rotatably mounted in a bar-shaped terminal to prevent malfunctioning by closing an input device like a keypad in a call standby mode. However, like the bar-type terminal, the flip-type terminal also has a limitation on its miniaturization because a sufficient distance has to be secured between a transmitting unit and a receiving unit.

In the folder-type terminal, a pair of housings are foldably coupled to each other. An input device and an output device are separately disposed in the housings, thereby contributing to the miniaturization of the terminal and making it easy to secure a distance between a transmitting unit and a receiving unit. For these reasons, the folder-type terminal has become mainstream in the portable terminal market.

The sliding-type terminal has a pair of housings that are slidably coupled to each other. An input device and an output device are separately disposed in the housings and a keypad as the input device is opened or closed by sliding of the housings, thereby preventing malfunction of the input device, facilitating the use of the terminal, and contributing to miniaturization of the terminal. For these reasons, the sliding-type terminal also has a large share of the folder-type terminal market.

Recently, terminals of various shapes have emerged to satisfy users' various tastes.

Moreover, with efforts to commercialize Digital Multimedia Broadcasting (DMB) and the portable Internet, the inconveniences of conventional portable terminals are on the rise.

For example, although the folder-type portable terminal is easy to miniaturize and carry and is convenient for voice communication and short message transmission as in a phone mode, it is inconvenient in a TV mode, a DMB mode, and a VOD mode for watching a moving picture because users must keep their eyes on a display unit of the portable terminal for a long time.

Therefore, there is a need for a portable terminal having a display unit that is positioned in various directions or at various angles as desired by a user, thereby allowing the user to conveniently view a displayed screen.

SUMMARY OF THE INVENTION

An aspect of the present invention is to address at least the above mentioned problems and/or disadvantages and to provide at least the advantages described below. Accordingly, an aspect of the present invention is to provide a rotary-type hinge apparatus of a folder-type portable terminal, which allows a user to conveniently view a display screen.

Another aspect of the present invention is to provide a rotary-type hinge apparatus capable of variously adjusting the viewing angle of a display unit included in a portable terminal.

According to one aspect of the present invention, a rotary-type hinge apparatus for a portable terminal including a main body, a folder, a connection member for coupling the main body with the folder, and a hinge apparatus for rotatably coupling the connection member to the main body is provided. The rotary-type hinge apparatus includes housing means mounted in the connection member, cam means including a center cam unit having at least three cam faces and a pair of side cam units for moving towards or away from the center cam unit according to the rotation of the folder in order to maintain close contact with selected cam faces, and for adjusting the rotation angle of the folder by cam movement with the selected cam faces while being accommodated in the housing means, elastic bodies for causing the side cam units to closely contact the selected cam faces while being accommodated in the housing means, and an axis extending in a longitudinal direction of the center cam unit.

BRIEF DESCRIPTION OF THE DRAWINGS

The above and other aspects, features and advantages of exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
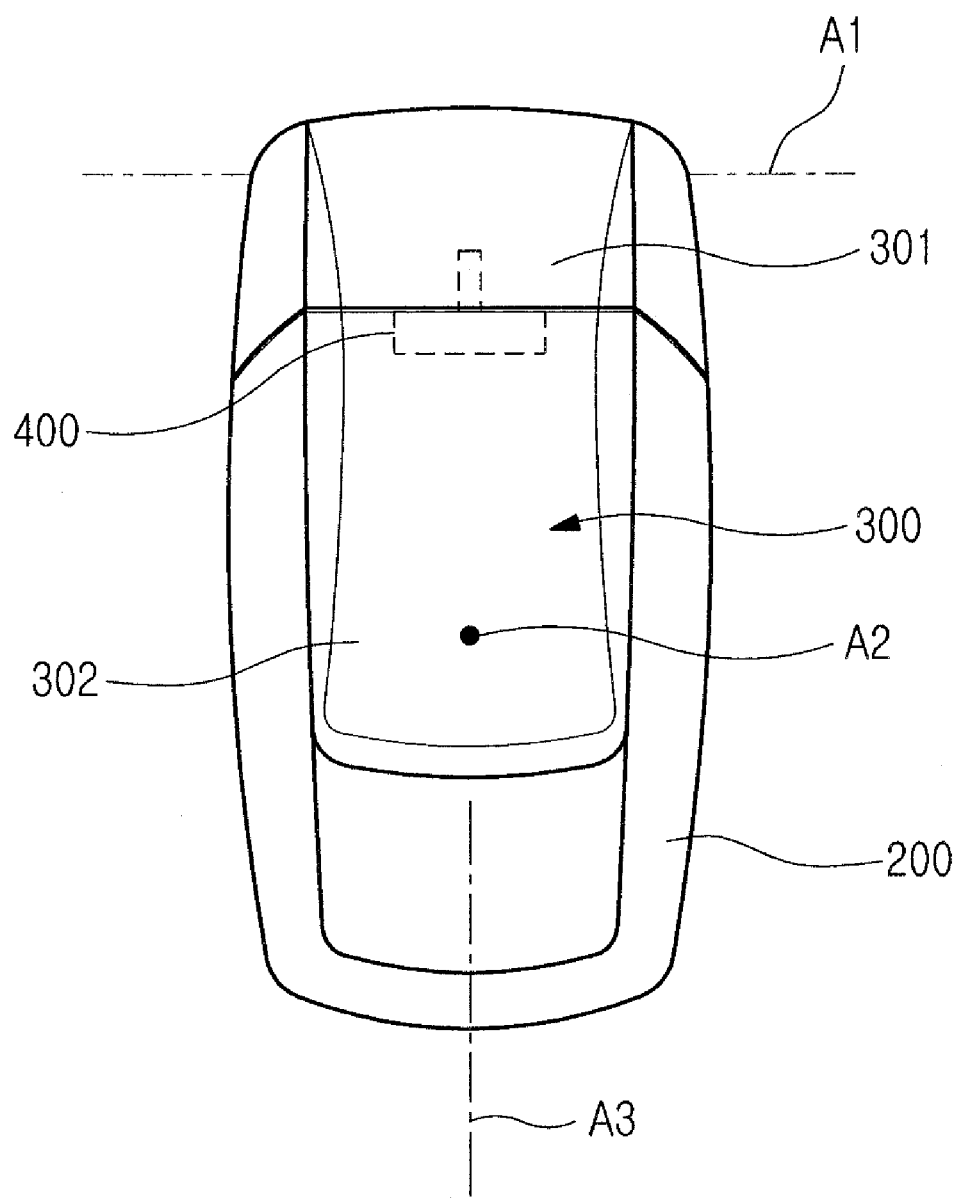
FIG. 1 is a front view of a closed state of a portable terminal having a rotary-type hinge apparatus according to an exemplary embodiment of the present invention.
Figure 2:
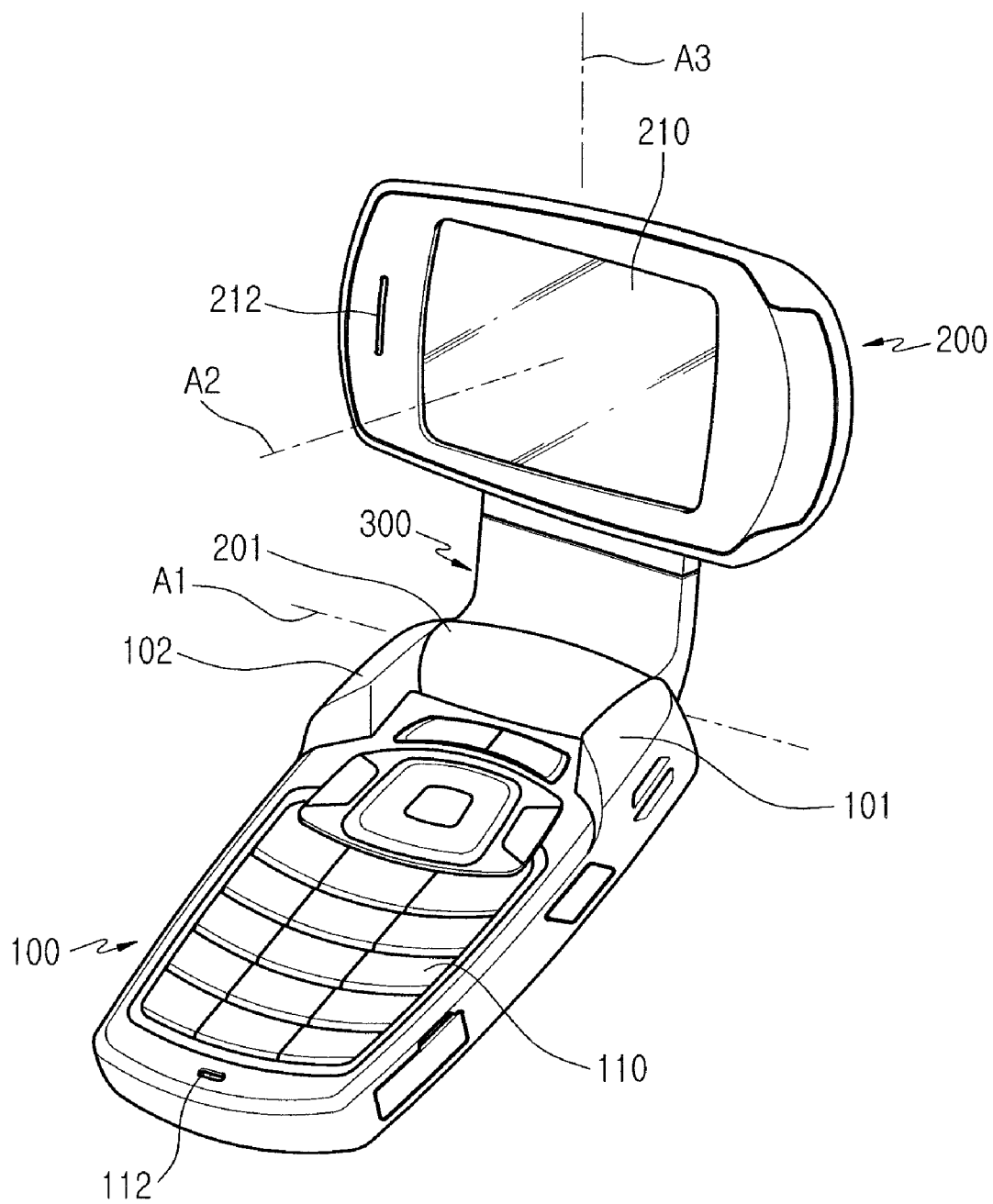
FIG. 2 is a perspective view of an opened state of a portable terminal having a rotary-type hinge apparatus according to an exemplary embodiment of the present invention.
Figure 3:
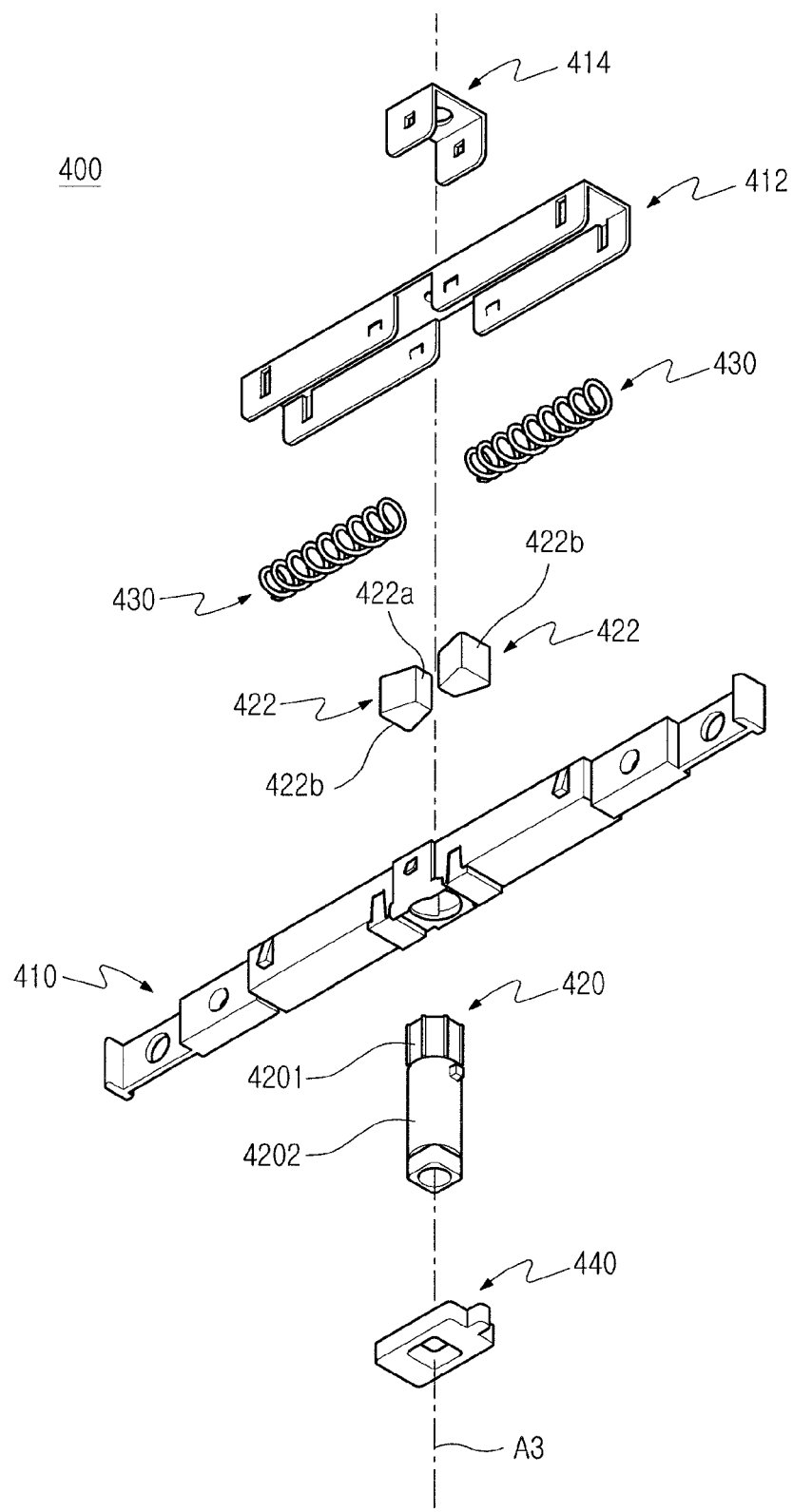
FIG. 3 is an exploded perspective view of a rotary-type hinge apparatus according to an exemplary embodiment of the present invention.
Figure 4:
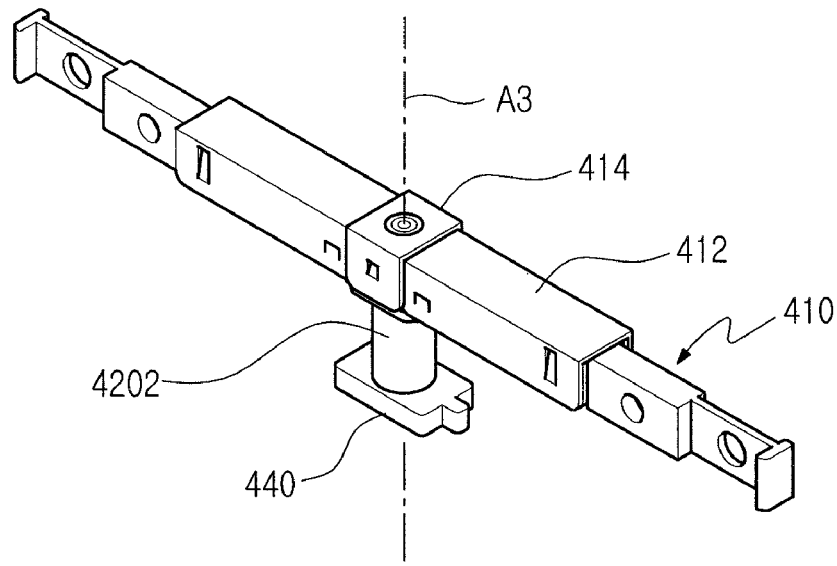
FIG. 4 is an assembled perspective view of a rotary-type hinge apparatus according to an exemplary embodiment of the present invention.
Figure 5:
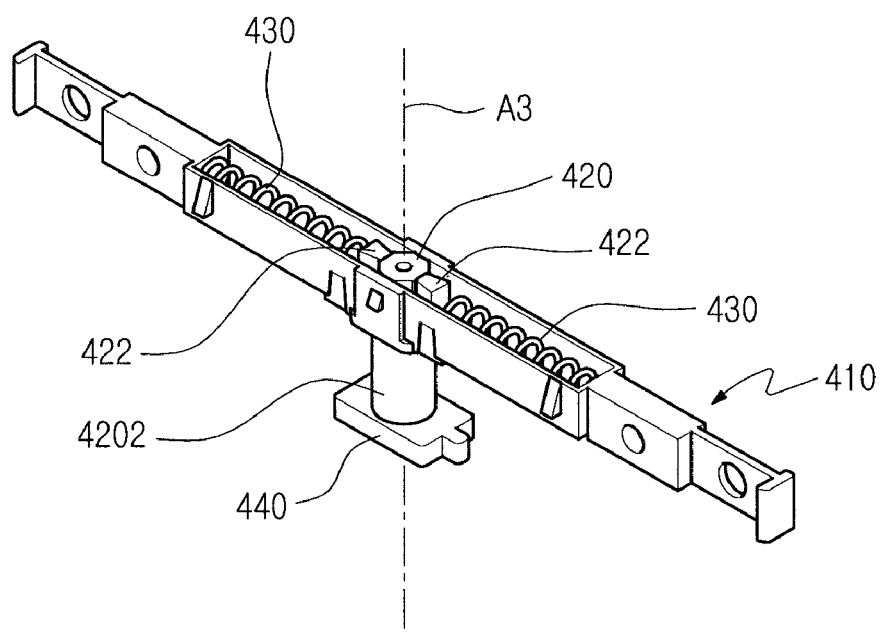
FIG. 5 is a perspective view showing a state where cam means and elastic bodies are mounted in housing means of a rotary-type hinge apparatus according to an exemplary embodiment of the present invention.

As illustrated in FIGS. 1 and 2, a portable terminal having a rotary-type hinge apparatus 400 according to an exemplary embodiment of the present invention includes a main body 100, a folder 200, and a connection member 300 for rotatably connecting the folder 200 to the main body 100. The folder 200 is configured to rotate about a first hinge axis A1 from the main body 100, to rotate about a second hinge axis A2 from the connection member 300, and to rotate about a third hinge axis A3 from the connection member 300. The connection member 300 is rotatably coupled to the main body 100 by a first hinge apparatus (not shown). The folder 200 is coupled to the connection member 300 by a second hinge apparatus (not shown) such that it can rotate while facing the connection member 300. In FIG. 2, side hinge arms 101 and 102 and a center hinge arm 201 of the first hinge apparatus are shown.

In order words, the portable terminal according to the present invention comprises a main body 100, a connected member 300 for rotating about a first hinge axis A1 in a direction towards or away from the main body 100, a folder 200 mounted in the connection member 300 to rotate about a second hinge axis A2 and a third hinge axis A3 while facing the first hinge axis A1 in which the second hinge axis A2 is spaced apart from the first hinge axis A1 and is oriented perpendicular to the first hinge axis A1 and the third hinge axis A3 is oriented perpendicular to the first hinge axis A1 and the second hinge axis A2, and a rotary-type hinge apparatus 400 mounted in the connection member 300 to allow the folder 200 to rotate about the third hinge axis A3 and to stepwise adjust the angle of rotation about the third hinge axis A3. The rotary-type hinge apparatus 400 is provided to adjust user's viewing angle of a display unit.

The connection member 300 includes the rotary-type hinge apparatus 400 in order to rotate the folder 200 from the main body 100 about the third hinge axis A3. The connection member 300 includes a first portion 301 and a second portion 302. The first portion 301 is connected to the main body 100 in such a way as to rotate towards or away from the main body 100 and the second portion 302 is connected to the folder 200 in such a way as to face the external face of the folder 200.

As shown in FIG. 2, the inner face of the main body 100 includes a plurality of keys 110 and a microphone device 112 and the inner face of the folder 200 includes a display unit 210 and a speaker device 212.

The rotary-type hinge apparatus 400 according to an exemplary embodiment of the present invention is mounted in the connection member 300 in order to allow the folder 200 to rotate about the third hinge axis A3. Housing means to be described later are disposed in the first portion 301 and an axis is disposed in the second portion 302.

Hereinafter, the structure of the rotary-type hinge apparatus 400 according to an exemplary embodiment of the present invention will be described in detail with reference to FIGS. 3 to 6. The rotary-type hinge apparatus 400 includes housing means 410, 412, and 414, cam means 420 and 422, elastic bodies 430, and a rotation angle adjustment unit 4201. The housing means 410, 412, and 414 accommodate the cam means 420 and 422, the elastic bodies 430, and the rotation angle adjustment unit which includes cam faces 4201.

The housing means 410, 412, and 414 include a main hinge housing 410, an upper hinge housing 412, and a subsidiary cover 414. The upper hinge housing 412 is coupled to the main hinge housing 410 that accommodates the cam means 420 and 422 and the elastic bodies 430, and the subsidiary cover 414 is coupled to the upper hinge housing 412. A coupling structure between the housing means 410, 412, and 414 includes protrusions and openings combined therewith.

The cam means 420 and 422 include a center cam unit 420 and side cam units 422 that perform cam movement with the center cam unit 420. The center cam unit 420 includes an axis 4202. The axis 4202 extends from the center cam unit 420 in a longitudinal direction. The axis 4202 is disposed in the second portion 302 of the connection member 300 and is fixed by a fixing member 440. The center cam unit 420 includes at least three cam faces 4201. The side cam units 422 are disposed as a pair at both sides of the center cam unit 420. Moreover, the center cam unit 420 and the side cam units 422 are maintained close to each other by the elastic bodies 430. The side cam units 422 move in the longitudinal direction of the main hinge housing 410 in a direction towards or away from each other.

The rotation angle adjustment unit includes at least three cam faces 4201 included in the center cam unit 420. The center cam unit 420 has a polygonal cross-section and thus has the at least three cam faces 4201. If the side cam units 422 closely contact selected cam faces 4201, the rotation of the folder 200 is stopped at a predetermined angle. If the side cam units 422 move to adjacent another cam faces 4201, the rotation of the folder 200 is stopped at another predetermined angle. In other words, the side cam units 422 closely contact the center cam unit 420, move, and then closely contact the center cam unit 420 again according to the rotation of the folder 200, whereby the rotation angle adjustment unit 4201 can adjust the rotation angle of the folder 200, more specifically, the viewing angle of a display unit.

Figure 6:
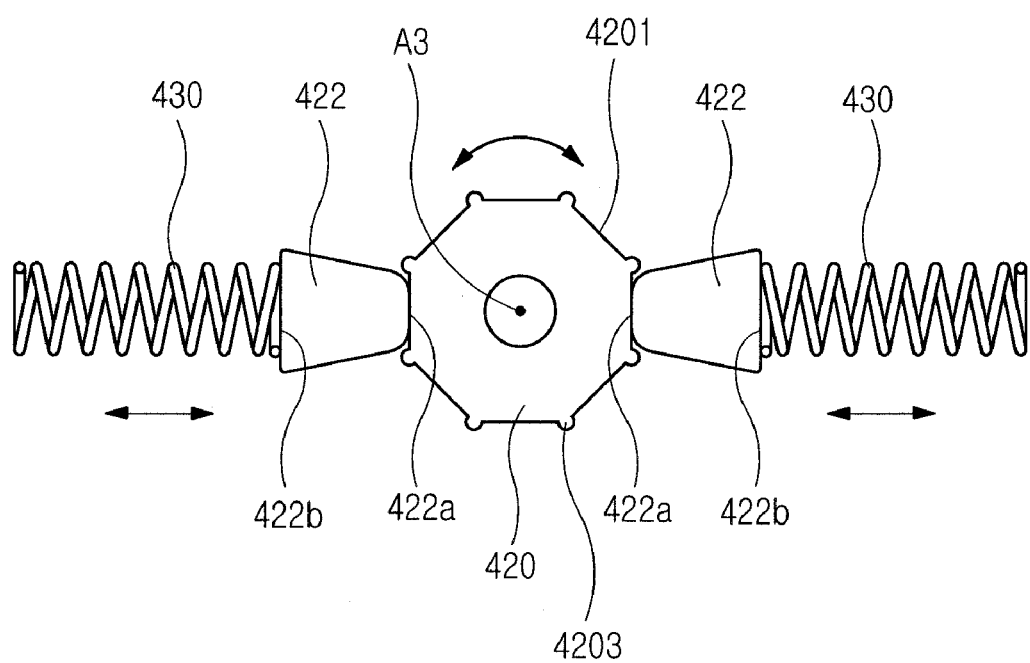
FIG. 6 is a front view showing an operation between cam means and elastic bodies of a rotary-type hinge apparatus according to an exemplary embodiment of the present invention.

As shown in FIG. 6, protrusions 4203 are provided between the cam faces 4201 of the center cam unit 420. The protrusions 4203 extend in the longitudinal direction of the center cam unit 420. The protrusions 4203 stably support the close contact state between the side cam units 422 and the cam faces 4201. Movement between the center cam unit 420 and the side cam units 422 includes a sliding movement.

The side cam units 422 have tapered cross-sections (for example, trapezoid-shaped cross-sections) for stable cam movement with the center cam unit 420. In other words, a face 422a of the side cam unit 422 has a relatively small area, but a rear face 422b of the side cam unit 422 has a relatively large area in order to maintain stable contact with the elastic bodies 430. The cam face 4201 of the center cam unit 420 and the face 422a of the side cam unit 422 are flat for stable contact with each other.

In an exemplary embodiment, the elastic bodies 430 are coil springs, more specifically, compression coil springs. The elastic bodies 430 are disposed in the outer sides of the center cam unit 420 centered in the main hinge housing 410 and against the side cam units 422, thereby providing a force for causing the center cam unit 420 and the side cam units 422 to closely contact each other.

Although the center cam unit 420 has 7 cam faces 4201 for 7-angle adjustment in FIG. 6, the number of cam faces 4201 of the center cam unit 420 may be greater or less than 7 and is not limited to 7.

As mentioned above, for stable cam movement according to the rotation of the folder 200, in an exemplary embodiment the side cam units 422 are disposed symmetrically at both sides of the center cam unit 420 and the elastic bodies 430 are disposed symmetrically at both outer sides of the side cam units 422.

As described above, according to a rotary-type hinge apparatus for a portable terminal according to an exemplary embodiment of the present invention, for a folder-type terminal, a rotation angle can be adjusted in an opened state of a display unit, thereby allowing a user to conveniently view DMB for a long time and thus improving a User Interface (UI) environment.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A rotary-type hinge apparatus for a portable terminal comprising:
   a main body;
   a folder;
   a connection member for coupling the main body with the folder, wherein the connection member is coupled to the main body by a first hinge apparatus and the folder is coupled to the connection member by a second hinge apparatus;
   housing means mounted in the connection member;
   cam means including a center cam unit having at least three cam faces and a pair of side cam units for moving towards or away from the center cam unit according to a rotation of the folder in order to maintain close contact with selected cam faces, and adjusting a rotation angle of the folder by cam movement with the selected cam faces while being accommodated in the housing means, wherein protrusions extending in the longitudinal direction are provided between the cam faces for stably supporting a close contact state between the cam faces and the pair of side cam units;
   elastic bodies for causing the pair of side cam units to closely contact the selected cam faces while being accommodated in the housing means; and
   an axis extending in a longitudinal direction of the center cam unit.

2. The rotary-type hinge apparatus of claim 1, wherein the housing means comprises:
   a main hinge housing for accommodating the cam means and the elastic bodies in its longitudinal direction;
   an upper hinge housing coupled to the main hinge housing; and
   a subsidiary cover coupled to the upper hinge housing.

3. The rotary-type hinge apparatus of claim 1, wherein the center cam unit comprises a polygonal cross-section.

4. The rotary-type hinge apparatus of claim 1, wherein the cam faces are substantially flat.

5. The rotary-type hinge apparatus of claim 4, wherein the pair of side cam units are disposed symmetrically with respect to the center cam unit, in which each of the pair of side cam units comprises a first face and a second face, wherein each of the first faces face each other with respect to the center cam unit and each of the second faces face the elastic bodies, respectively.

6. The rotary-type hinge apparatus of claim 1, wherein each of the pair of side cam units comprises a trapezoid-shaped cross-section, in which one face of each of the pair of side cam units closely contacts one of the selected cam faces and the other face of each of the pair of side cam units closely contacts one of the elastic bodies, respectively.

7. The rotary-type hinge apparatus of claim 1, wherein the connection member comprises a first portion coupled with the main body and a second portion coupled with the folder, and the axis is disposed in the first portion and the housing means are disposed in the second portion.

8. A portable terminal comprising:
   a housing mounted in a connection member, wherein the connection member is coupled to a main body of the portable terminal by a first hinge apparatus and a folder of the portable terminal is coupled to the connection member by a second hinge apparatus;
   a cam located in the housing and including a center cam unit having at least three cam faces and a pair of side cam units, wherein the pair of side cam units are for moving towards or away from the center cam unit according to a rotation of the center cam to maintain close contact with selected cam faces, and for adjusting a rotation angle of the cam, wherein the center cam comprises protrusions extending in a longitudinal direction between the cam faces for stably supporting a close contact state between the cam faces and the pair of side cam units; and
   a plurality of elastic bodies located in the housing for causing the pair of side cam units to closely contact the selected cam faces.

9. The portable terminal of claim 8, wherein the housing comprises:
   a main hinge housing for accommodating the cam means and the elastic bodies in a longitudinal direction;
   an upper hinge housing coupled to the main hinge housing; and
   a subsidiary cover coupled to the upper hinge housing.

10. The portable terminal of claim 8, wherein the center cam unit comprises a polygonal cross-section.

11. The portable terminal of claim 8, wherein the at least three cam faces are substantially flat.

12. The portable terminal of claim 11, wherein the pair of side cam units are disposed symmetrically with respect to the center cam unit, in which each of the pair of side cam units comprises a first face and a second face, wherein each of the first faces face each other with respect to the center cam unit and each of the second faces face the elastic bodies, respectively.

13. The portable terminal of claim 8, wherein each of the pair of side cam units comprises a trapezoid-shaped cross-section, in which one face of each of the pair of side cam units closely contacts one of the selected cam faces and the other face of each of the side cam units closely contacts one of the elastic bodies, respectively.

* * * * *